Figure 1:
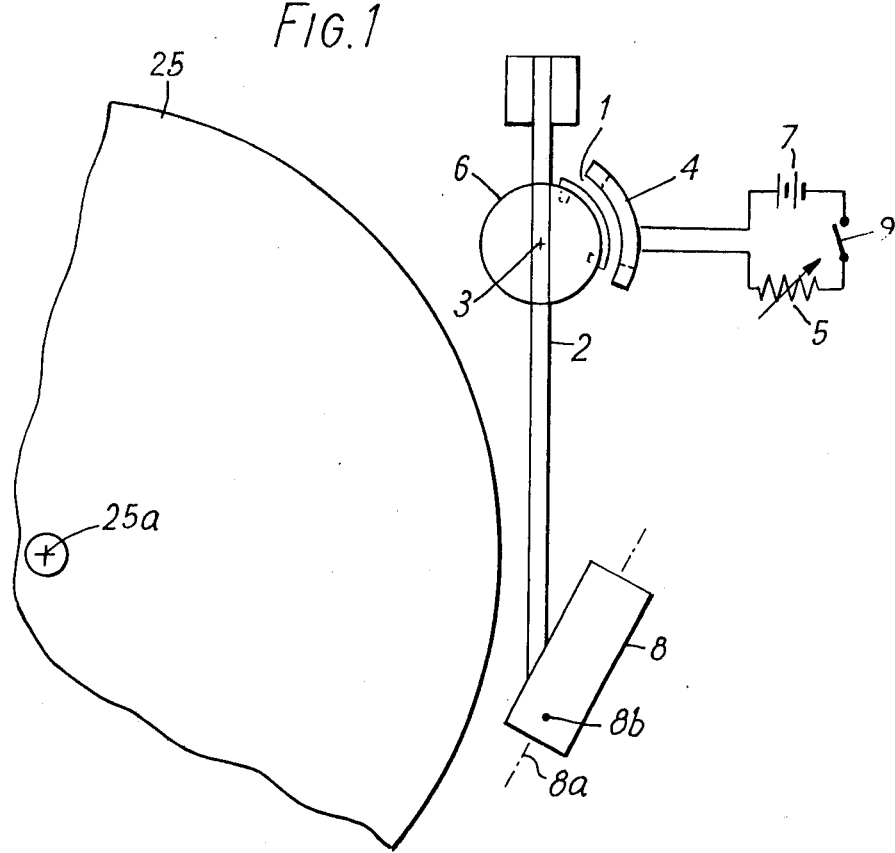

United States Patent [19]

Wren

[11] 4,076,258
[45] Feb. 28, 1978

[54] DISC-RECORD PLAYERS

[75] Inventor: John Pelham Wren, Swindon, England

[73] Assignee: Plessey Handel und Investments A.G., Zug, Switzerland

[21] Appl. No.: 736,222

[22] Filed: Oct. 27, 1976

[30] Foreign Application Priority Data

Oct. 28, 1975 United Kingdom ............... 44399/75

[51] Int. Cl.$^2$ ................................................ G11B 3/10
[52] U.S. Cl. .................................................. 274/23 R
[58] Field of Search ...................................... 274/23 R

[56] References Cited

U.S. PATENT DOCUMENTS

| 3,292,935 | 12/1966 | Cooper | 274/23 R |
| 3,731,938 | 5/1973 | Wren | 274/23 R |
| 3,779,563 | 12/1973 | Irisawa | 274/23 R |

FOREIGN PATENT DOCUMENTS 2,354,530 10/1974 Germany ............................ 274/23 R Primary Examiner—Steven L. Stephan
Attorney, Agent, or Firm—Fleit & Jacobson

[57] ABSTRACT

An anti-skating device for a disc-record player comprises two permament-magnet plates carried by the pickup-arm support and each extending over a sector of a circle round the same, the plates being magnetized, each across its thickness, with opposite polarities to produce each a magnetic flux at right angles to the direction of plate movement, and a coil fixed to the player structure in which two conductor elements extend across the flux of each magnet plate respectively, transversely to the direction of magnet movement, and carry the coil current in opposite directions.

Current cut-off means are preferably provided to allow the winding to be de-energized when, particularly during a cueing operation, the pickup stylus is lifted from the record surface.

9 Claims, 8 Drawing Figures

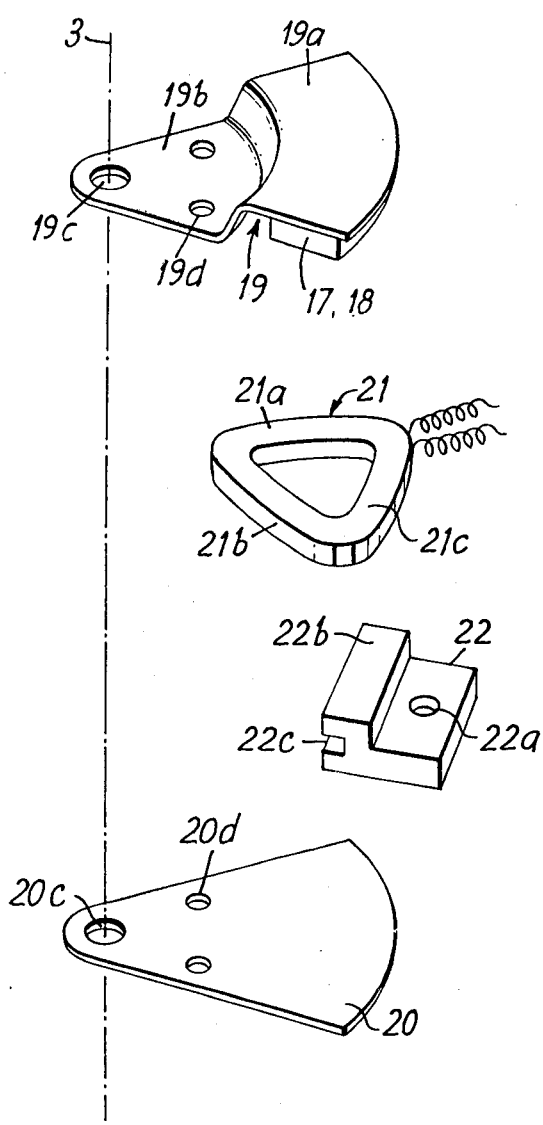
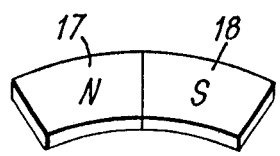

DISC-RECORD PLAYERS

This invention relates to disc-record players of the kind in which the playing groove of the record is scanned by a stylus carried on a pickup arm which is mounted on an arm support monable in the player for joint pivotal movement with the arm about a vertical axis, and the invention has for an object to provide improved means for applying to the pickup arm support a torque about this vertical axis and thus to provide means suitable for providing compensation for the so-called skating force, that is to say for that component of the frictional force that acts upon the stylus at its point of contact with the record due to the rotation of the latter, which acts at right angles to the radius connecting the contact point of the stylus with the said vertical axis. The term record player, throughout the present specification, is intended to be broad enough to include record changers.

Another object is to provide an improved electrodynamic anti-skating device which when energised with electric direct current of a predetermined or preset constant value, will produce an anti-skating torque of substantially constant value throughout the range of operative arm movement.

The device provided for this purpose by the present invention essentially comprises a permanent magnet means secured on the arm support to produce in an air space extending over an arc of a circle about said vertical axis, whose angle is at least substantially equal to the angle of operative arm movement about the said vertical axis, a magnetic flux substantially normal to the tangential direction of the said circle, and of a strength substantially uniform over said angle, and a winding member held stationary in the player and comprising a winding having conductor portions which extend through said air space in a direction substantially normal to the direction of the field and to the direction of tangential velocity of the most closely adjacent surface element of the magnet means. Various means for effecting compensation of the skating force have previously been proposed, including mechanical means, for example a spring, or a system of two co-operating magnets, one fixed in the player and the other rotating with the arm, but the device according to the present invention has a number of advantages over these existing compensation means, for example in that the magnitude of the compensation force or torque can be readily adjusted by controlling the current applied to the winding; that the control knob or the like may be placed at any convenient point of the record player unit, thus avoiding the inconvenience and risk involved in having to operate control means in close proximity to the delicate arm pivot; and a further advantage is that the bias force may be completely suppressed by opening the electric circuit for the energisation of the winding, thus facilitating accurate setting up of the stylus force and also avoiding so-called stylus drift during cueing operations produced by the application of bias-compensation torque before the stylus makes contact with the record, that is to say when there is no skating force.

Preferably the magnet means comprises two permanent magnet elements, formed as sectors of an annular disc or of a cylindrical sleeve, and arranged, preferably in abutting relation, to cover two sectors each magnetised across its thickness but in opposite directions to each other, in conjunction with a yoke member for the magnetic flux, which forms with one of the surfaces of each sector element an air gap in which conductors of the winding is arranged to move relative to the magnet means, each turn of the winding being arranged to provide two portions in whose conductors current will flow across the gap, in a direction at right angles to both the direction of the magnet flux and to the direction of the relative movement of the magnet member and the winding, the two winding portions being arranged to pass through the air gap within the flux emitted by the two sector elements respectively, with the current in said two portions flowing in opposite directions, so that both these winding portions will produce torque in the same direction. Bearing in mind that the total movement of the pickup arm between its rest position and the position which it assumes when playing the innermost turn of the playing groove of a record, is only between 35° and 50°, there will be no practical difficulty in ensuring that during this movement each winding portion will remain well within the flux from its associated sector element of the magnet means thus ensuring the production of a torque which will be substantially constant throughout the movement of the pickup arm.

The flux may be arranged radially with the permanent—magnet elements formed as sectors of a cylinder round the arm-pivot axis, or alternatively an axial magnetic flux may be employed with the use of flat magnet elements in the shape of sectors of an annular disc.

Figure 2:
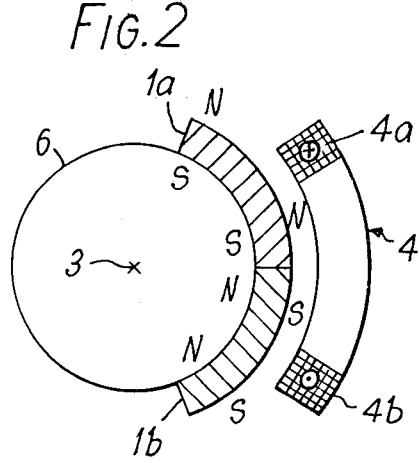
Figure 3:
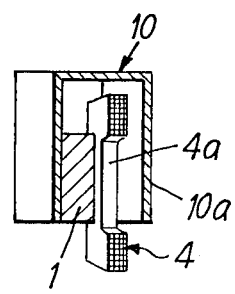
Figure 4:
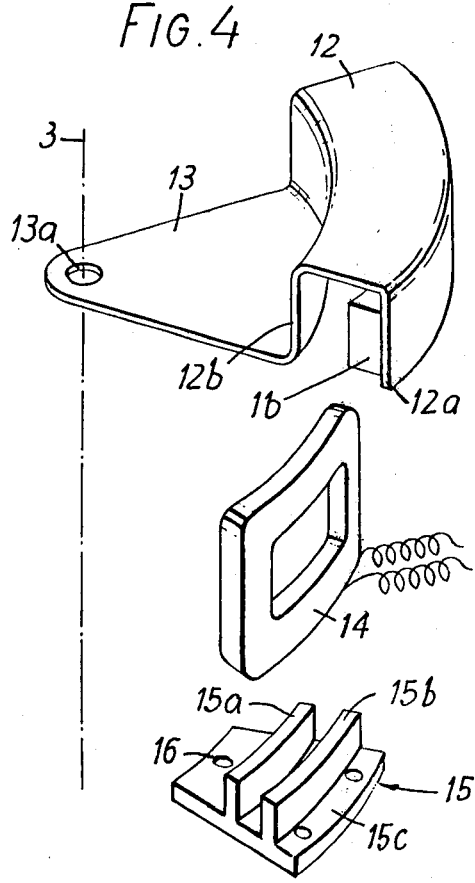
Figure 5:
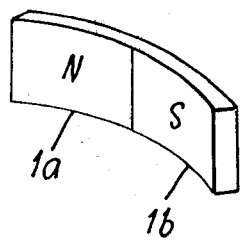
Figure 8:
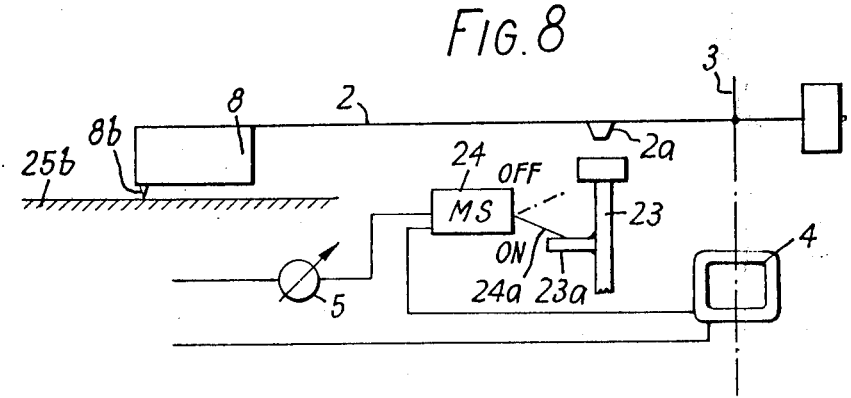

Further features of various forms of devices embodying the present invention will become apparent from the following description with reference to the accompanying drawings, in which FIG. 1 is a somewhat diagrammatic view on part of the unit-plate assembly of a gramophone record player and shows the pickup arm and one form of a device according to the present invention, FIG. 2 is a sectional plan view showing, to a larger scale, the permanent magnet means and the coil constituting the winding of this embodiment, FIG. 3 is a radial section of the permanent magnet means and coil, in which the permanent magnet means is equipped with a yoke portion for the flux-return path, thus providing an annular air gap which is crossed by the flux from the flux emitting surface of the magnet to a complementary surface provided by the yoke portion, FIG. 4 is an exploded perspective view of an embodiment of the device according to the invention which employs a magnetic flux disposed radially relative to the vertical arm-pivot axis, FIG. 5 is a perspective view showing the magnet elements employed in the permanent magnet means of this embodiment, FIG. 6 is an exploded perspective view of a preferred embodiment of the device according to the invention which employs a magnetic flux disposed in an axial direction relative to the vertical arm-pivot axis, FIG. 7 is a perspective view of the magnet elements of this embodiment, and FIG. 8 is a diagrammatic side elevation showing the pickup arm together with a portion of the arm-lifting mechanism and a record being played, and also shows diagrammatically the arrangement of a switch in the electric circuit for the winding of a device according to the invention which automatically ensures that the winding is de-energised when the pickup arm is lifted by the arm-lifting pin during a cueing operation.

Referring now first to FIGS. 1 and 2, the pickup arm 2 of a disc record player, which may be arranged for manual, semi-automatic, or fully automatic playing of a record or a succession of records, is, in a conventional manner, mounted in an arm support arranged for movement in the player about a vertical axis 3 to permit the arm to follow the record groove on a disc record, and also to be moved outwardly of the record to a position of rest. The arm carries a pickup head 8, which is fitted with a cartridge arranged along an axis 8a and having a stylus 8b for engagement of the record groove. As shown in the illustration, the axis 8a of the pickup head 8 and cartridge is arranged at an angle to the pickup arm 2 in order to ensure that during the play the axis 8a substantially corresponds to the tangential direction of the record groove at a point at which it is engaged by the stylus 8b, and it will be readily appreciated that, since the frictional force between the record and the stylus extends substantially in the direction of the axis 8a, it will exert upon the pickup arm 2 a torque about a vertical axis 3 which is substantially equal to the product of the radial distance of the stylus 8b from the arm-pivot axis 3 multiplied by that component of the friction force acting upon the stylus 8b which acts at right angles to the said radial distance, and as is generally known, this torque tends to move the arm towards the centre of the turntable.

In order to compensate for the effect of this torque, a permanent-magnet means 1 comprising two elements 1a and 1b in the form of adjacent sectors of a cylindrical sleeve, is secured to drum 6 fixed on the arm support constituted by the pickup-arm spindle coaxially with the vertical pivot axis 3, so as to move round that axis jointly with the pickup arm 2. Both elements 1a and 1b are permanently magnetised in the radial direction in such a manner that the North pole of the one element for example of element 1a is at its outer cylinder surface while the North pole of the other element is at its inner surface, as indicated by N and S in FIG. 2 and each extends over an angle sufficient to cover the total operative movement of the pickup arm. A winding in the form of a coil 4 which is curved according to a cylinder coaxial with that of the magnet elements 1a and 1b, is secured to the stationary part of the record-player structure and is arranged to be energised with direct current from any suitable source, indicated as a battery 7, through a circuit which includes an adjustable resistor 5 and an on-off switch 9. The coil 4 is so arranged that two portions 4a and 4b of it, which preferably are substantially rectilinear, and in which the current flows substantially parallel to the axis 3, are respectively placed in the radial field emitted by the two permanent magnet elements 1a and 1b. Since, when the on-off switch 9 is closed to energise the coil, current will flow through the two portions 4a and 4b in opposite directions, and these two portions are also arranged in parts of the field of the permanent-magnet member in which the radial directions of the flux are opposite to each other, both elements 4a and 4b will contribute to a torque in one and the same direction, which is arranged to be such as to tend to move the arm 2 away from the centre of the record, i.e., opposite to the torque exerted by the skating force, and by adjustment of the variable resistor 8, the torque exerted by the device can be made equal to the above-mentioned skating torque.

It will also be observed that, while in all mechanical skating-force compensators of which we are aware, the provision of the compensator will produce a tendency for the pickup arm to move outwardly when the arm has been set to a cueing position, (so-called cueing drift) due to the presence of the compensator torque in the absence of a skating torque, the present invention offers the possibility of eliminating such interference with cueing procedure by simply opening the switch 9 until the stylus rests on the record.

In practice the arrangement as so far described with reference to FIGS. 1 and 2 suffers from the drawback that the flux path of the flux passing through the conductors of the winding coil from one pole of a permanent-magnet element has to traverse a long distance through air to establish a closed path to the other pole, and that therefore a relatively strong magnet is required for producing a given strength of effective flux, and for this reason the permanent-magnet means preferably comprises, as illustrated in FIG. 3, a yoke member 10 which extends from that surface of the permanent magnet elements which faces away from the winding 4, round the edge of the winding coil 4 to provide a complementary pole face 10a which faces the opposite surface on the permanent-magnet member 1 across an air gap, in which the portions 4a and 4b of the winding 4 are accommodated.

A practical form of the magnet structure and the winding structure of an arrangement as described with reference to FIGS. 1 to 3 is illustrated in FIGS. 4 and 5, in which the yoke structure is constituted by a member 12 pressed in mild steel, with the yoke in the shape of an inverted U-channel curved to form a sector of an annulus about the arm-pivot axis 3 and formed integral with a flat, sector-shaped portion 13 which has a bore 38 extending along the axis 3 for centering the member 12 on the pickup-arm support spindle of a disc record player. The permanent-magnet elements 1a and 1b are secured, inside the channel, to the outer wall 12a of the U-channel in order to accommodate a maximum circumferential length of magnet. The winding is formed as a coil 14 wound in substantially rectangular shape but curved cylindrically in accordance with mean curvature of the air gap formed between the inner wall 12b of the channel 12 and the inner surface of the magnet elements 1a, 1b. This coil is mounted between two similarly curved ribs 15a and 15b extending from a plate-like base 15c of a coil holder 15. The base 15c is provided with bores 16, through which screws may be passed for attaching the coil holder to the fixed structure of the record player.

FIGS. 6 and 7 similarly illustrate a preferred construction of the magnet means and the winding of an arrangement employing a magnetic flux in the direction of the axis 3. The permanent-magnet means comprises two flat permanent-magnet plates 17 and 18, which are formed as plates shaped and arranged as adjacent sectors of a flat ring, coaxial with the arm-pivot axis 3 and magnetised across their thickness with opposite polarities. Theses magnet plates 17 and 18 are secured to the underside of a part-annular flange 19a formed of mild steel and integral with, but axially offset relative to, a flat centering portion 19b which jointly with it forms a yoke element 19, and which is provided with a centering bore 19c fitting round the pickup-arm support spindle of a record player, and with two fixing bores 19d. A further yoke element 20, also of mild steel, and of similar general outline but flat, is similarly provided with a centering bore 20c and with fixing and locating bores 20d, all of which are arranged to be aligned with the bores 19c and 19d respectively of yoke element 19. The two yoke elements 19 and 20 are arranged with their outlines aligned in the direction of the axis 3, and the amount of axial offset of the annular portion 19a relative to attachment portion 19b and element 19 is so dimensioned as to leave, when the element 20 is in surface contact with the portion 19b of the element 19, an air gap between the free surface of the magnet elements 17, 18 and the adjacent surface of the plate-like element 20, which is sufficient to accommodate the thickness of a winding constituted by a coil 21. The latter has a flat, near-triangular shaped to provide two conductor portions 21a and 21b and a connecting portion 21c formed approximately as a sector of flat ring, and a coil holder 22 is provided, which can be secured to the stationary portion of the record player by a screw extending through a bore 22a. The coil holder 22 is formed as a plate with a side portion 22b which is formed with a lateral groove 22c for holding engagement with the outer edge of the connecting portion 21c of the coil 21, whereby the coil 21 is held in such a position that its conductor portions 21a and 21b extend substantially radially relative to the axis 3 of the pivot-arm spindle.

An arrangement such as that described with reference to FIG. 6 and 7, in which a magnetic flux in the direction of the spindle axis 3 is employed, offers the advantage over an arrangement, such as that described with FIGS. 4 to 5, in which a radial flux is employed, that it avoids the need for making a coil whose turns are arranged in a cylindrically curved surface.

Both the embodiments described respectively with reference to FIGS. 4 and 5 and to FIGS. 6 and 7 may be modified in detail without exceeding the scope of the general principle of the invention as claimed in the appended claims; in particular, while in the embodiments described the two permanent-magnet elements are arranged to form abutting sectors of a circular configuration, these two elements may be spaced from each other along such circle, thereby improving the quality of the magnetic flux in the vicinity of the adjacent ends, but at the cost of a decrease in compactness of the arrangement.

Referring now more particularly to the electric circuit for the energisation of the winding, it is believed advantageous to ensure automatic interruption of current flow when the pickup arm is lifted off the record, more particularly in automatic or semi-automatic record players. FIG. 8 illustrates an arrangement in which this is achieved. The energisation and de-energisation of the winding 4 is controlled by the movement of a pick-up-lifting pin 23 which is normally provided in automatic and semi-automatic record players and in record players equipped with a so-called cueing device. In the arrangement of FIG. 8, the energisation circuit for the winding 4 incorporates, in addition to the current-adjustment resistor 5, a microswitch 24, which is spring-biassed to its closed position and has an operating member 24a, while the arm-lifting pin 23 has a platform-forming spur 23a, on which the operating element 24a of the mocroswitch rests. The relative position of the microswitch and this platform is so determined that the switch is closed when the spur 23a is in its lowermost position, but will open when the lifting pin 23 is raised to reach a height at which it makes contact with an abutment 2a of the pickup arm 2 to raise the latter from the position illustrated in the Figure, in which the stylus 8b of the pickup 8 rests on a record 25 which has been placed on the record player; during downward movement of the lifting pin 23, the microswitch is arranged to close its contact only when the pin 23 has moved a certain distance below the point at which the stylus 8b makes contact with the record, thus preventing the device from exerting an outwardly acting force on the pickup arm before the stylus has engaged the record groove.

The arrangements of the permanent magnet means as described above with reference to various examples will produce a skate-compensating torque which is substantially constant over the angle of arm movement. If so desired, however, this torque may be arranged to undergo slight variations as a function of the angular position of the pickup arm in order to match the slight variations of the skating torque which are due to the fact that during the movement of the stylus across a record the angle between the skating force, i.e., the tangential direction of the record movement at the point of contact, and the radius connecting the pickup stylus with the vertical arm-pivot axis varies with radius. This can be achieved by so arranging or shaping, or arranging and shaping, the gap-forming surface of the yoke as to cause the flux across the gap to vary along the gap appropriately in its intensity and/or its area of action, by variation of the width of the gap and/or latter dimension of the pole-forming area in a direction transverse to the direction of relative movement of the winding.

A similar result may also be achieved by suitably arranging the shape and positioning of the magnet 1 in relation to the winding, more particularly in cases in which no yoke is provided.

Furthermore, as an alternative, or in addition, to the provision of the cut-off switch 9, the variable resistor 5 may be arranged to have an open-circuited end position.

What we claim is:

1. A skating-force compensation device for a gramophone pickup arm mounted on an arm support arranged for joint pivotal movement about a vertical axis relative to a base member, which comprises: a permanent magnet means mounted for joint movement with the arm support about said axis and constructed and magnetized to provide two pole faces of opposite polarities, both arranged substantially in a common surface of revolution about said vertical axis with each said pole face extending over an angle about said axis at least equal to the angle of operative movement of the pickup arm about said axis, said magnet means being magnetized at right angles to each pole face; a winding of conductor wire, mounted to be stationary relative to said base member and having two portions arranged in close proximity to said pole faces, said two portions arranged for respective electrodynamic co-operation with the flux from each of said pole faces; and yoke means of magnetizable material which are mounted for joint movement with said magnet means and arranged to form a yoke surface facing each said pole face at such a distance therefrom as to provide a gap sufficient to accommodate said winding portions, and which form a low-reluctance path for the magnetic flux of each said pole face beyond said gap, the lengths of conductor wire in each said portion extending substantially parallel to said surface of revolution and at right angles to the velocity vector of that element of said surface which directly faces the respective portion, said winding portions being electrically connected in series in such manner that when the winding is energised, the electric current flow in each of said winding portions produces, with the magnet flux passing said portion from the magnet means, torque about said axis in the same direction so as to counteract the skating-force of said tone arm.

2. A device as claimed in claim 1 which includes adjustable control means for the current flowing through the said winding so as to permit matching of the torque produced by the device to the skating torque.

3. A device as claimed in claim 1, which further comprises a switch operable to cut-off the flow of current through said winding.

4. A device as claimed in claim 1, for a record player having pickup-arm-lifting means operable to engage the pickup arm to lift the same above the surface of a record to be played, which further comprises a switch opened by said record-lifting means to cut-off the flow of current through said winding when the said arm-lifting means are in engagement with the pickup arm.

5. A device as claimed in claim 4, which includes delay means causing the cut-off means to remain operative to cut-off the current flow during a delay period after cessation of engagement of the arm by said pickup-lifting means.

6. A device as claimed in claim 1, wherein the magnet means comprises two plate elements forming angularly offset portions of a plane ring coaxial with that vertical axis, said elements being magnetized in the direction of said axis with respectively opposite polarities, said two winding portions being substantially rectilinear and extending respectively in radial directions relative to said vertical axis which are angularly offset about this axis in accordance with the angle by which said plate elements are mutually offset, the ends of said portions being respectively interconnected substantially inside the inner radius and substantially outside the outer radius of said plane ring.

7. A device as claimed in claim 6, wherein said plate elements are secured at one each of their pole faces on a first magnetizable yoke plate extending radially from the arm support, and a second magnetizable yoke plate of similar outline is arranged to so face the other pole faces of the plate elements as to form between said other pole faces and said second yoke plate a gap in which said winding portions are accommodated, said yoke plate being in magnetically conducting contact with said first yoke plate in a zone adjacent to said vertical axis and clear of said pole faces.

8. A device as claimed in claim 1, wherein the permanent magnet means comprises two plate elements which are cylindrically curved transversely to their major surfaces and so arranged as to both form portions of a single cylindrical sleeve about said vertical axis which are angularly offset relative to each other about said axis, said elements being each magnetized across its radial thickness with respectively opposite polarities, said two winding portions being substantially rectilinear and extending parallel to said axis and being arranged at positions which are mutually offset about said vertical axis by substantially the same angle by which said elements are mutually offset.

9. A device as claimed in claim 8, wherein the arm support is equipped with a yoke of magnetizable material having an inner substantially cylindrical wall, on which said plate elements are mounted each with its inner part-cylindrical surface in magnetically conducting contact with said wall, and an outer cylindrical wall so connected by a magnetically conducting end-wall element to said inner cylindrical wall as to provide between the outer part-cylindrical surfaces of said plate elements and said outer cylindrical wall a gap, in which said winding portions are accommodated.

* * * * *